Jan. 24, 1928.　　　　　　　　　　　　　　　1,657,014
F. R. KLAUS
METHOD OF MAKING CUSHION TIRE STRUCTURES
Original Filed Dec. 14, 1922

Inventor
F. R. Klaus.

By Lloyd L. Evans
Attorney

Patented Jan. 24, 1928.

1,657,014

UNITED STATES PATENT OFFICE.

FRED R. KLAUS, OF WARREN, OHIO, ASSIGNOR TO THE AMERICAN WELDING AND MANUFACTURING COMPANY, OF WARREN, OHIO, A CORPORATION OF OHIO.

METHOD OF MAKING CUSHION-TIRE STRUCTURES.

Original application filed December 14, 1922, Serial No. 607,948. Divided and this application filed January 17, 1924. Serial No. 686,918.

This invention relates to the method of making cushion tire structures and pertains more particularly to cushion tires of the type in which a tire with an inner recess or channel is secured upon a tire base.

An object of this invention is to provide a cushion tire structure comprising annular side sections and a central spacing ring rigidly connected therewith throughout its peripheral edges to form a relatively strong base to which the legs of an arch shaped cushion tire may be secured.

A further object of this invention is to provide a sectional rim or base in which the central spacing ring and the outer base sections have connecting means preventing relative movement circumferentially, radially and laterally, when mounted for use on a wheel.

Another object of the invention is to provide a means for holding the spacing ring in place while the base is being applied to the fixed rim of a wheel, so that no portion of the ring can move radially inwardly and project beyond the inner face of the side sections, thus interfering with the application of the base to the wheel, which is usually put on with a relatively great pressure in an axial direction, the pressure being sufficient to slightly expand the base and tension it on the fixed rim of a wheel.

Another object of the invention is to provide such a spacing ring and connecting means that while the base, when it is applied to a wheel is rigidly secured thereto, when the base and tire are demounted from the wheel the ring may be easily removed to permit the reuse of the ring and side sections with another tire, if desired.

Other objects will be apparent from the following description and annexed drawings, in which Figure 1 is a fragmentary perspective view partly in section showing the side members of the rim and a cushion tire.

Figure 1:
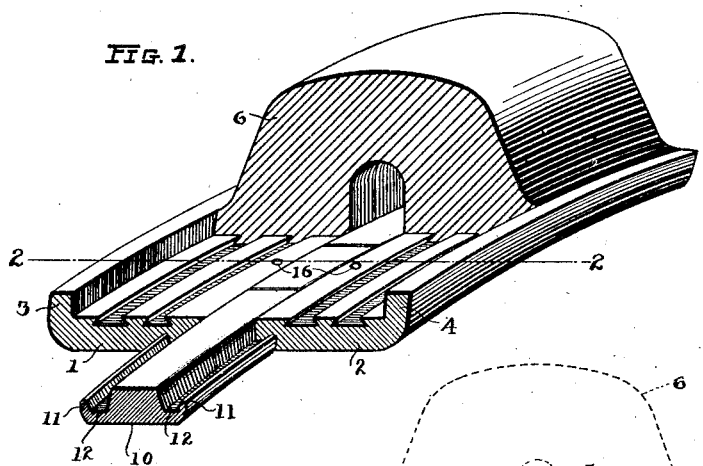
Figure 2:
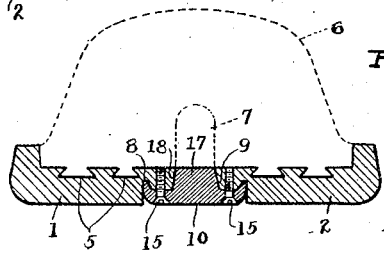
Fig. 2 is a section on line 2—2, Fig. 1.

Referring to the drawings, the tire base is made up of a pair of annular side sections 1 and 2 which are preferably endless rings and are provided with outturned flanges 3 and 4 and peripheral locking grooves 5 for receiving the rubber tire 6. The rubber tire is of the type recessed or channeled as at 7 between the side portions, which are secured to the rim base sections 1 and 2 in a well known manner, wherein a layer of hard rubber is interlocked with suitable grooves in the base sections and the soft rubber of the tire is united to the hard rubber.

At their inner edges the sections 1 and 2 are grooved circumferentially at 8 to form ribs 9 to interlock with the complementary members such as ribs 11 and grooves 12 of the spacing ring 10.

The spacing ring 10 is expanded into complete engagement with the annular side sections 1 and 2 throughout its peripheral edges and preferably is of such a diameter or circumferential dimension that it can be expanded against the side sections so that a stressed relation will exist between the two and yet the inside face of the spacing ring 10 will be substantially flush with the inside faces of the side sections 1 and 2 so that the base may be pressed onto the fixed rim of a wheel in the usual manner.

Figure 3:
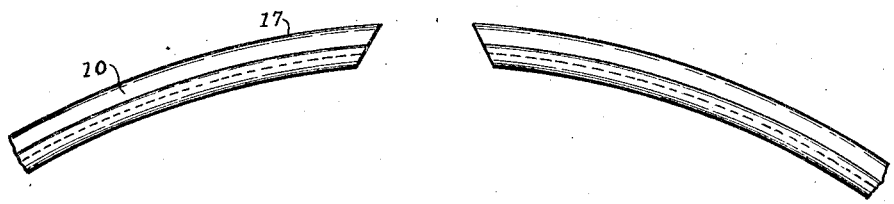
Fig. 3 is a fragmentary view of the ends of the spacing ring.
Figure 4:
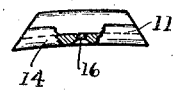
Fig. 4 shows a member for holding the ends of the spacing ring.

In the form of the invention disclosed herein, spacing ring 10 is preferably a transversely split ring such as shown in Fig. 3, such ring having the ends thereof beveled, shouldered or otherwise formed, so that they can be held in place by the retaining member 14 which is correspondingly shaped to engage the ends of the ring expanding it into place and holding it there. The spacing ring is not interposed between the side sections until after the tire is vulcanized to them and the cores forming the recess or arch in the tire are removed.

By omitting the spacing ring until after the tire sections are secured to the base sections, an unobstructed space is provided between the side sections of the base for the insertion and removal of the core for the recess in the tire while it is vulcanized to the base sections.

The retaining member 14 preferably has the same cross sectional shape as the spacing ring 10, so that it also interlocks with the side sections, and it is removably secured to the side sections by any suitable means, such as the countersunk screws 15 which engage threaded apertures 16 in the sections 1 and 2.

When the retaining member 14 is secured in position between the side sections of the base, it becomes substantially part of the ring 10 and holds the ring 10 expanded into engagement with the side sections, so that no part of the inner face of the ring and its expanding element projects radially inwardly to interfere with pressing the base upon the fixed rim of the wheel.

In addition to holding the ring expanded to prevent such interference, the retaining member secures the side sections of the base together so that there can be no relative movement of them circumferentially when the base is applied to the fixed rim of a wheel. Furthermore, the interlocking grooves on the ring, retaining member and adjacent side sections may be formed with a sufficient taper to insure the accurate positioning laterally of the ring and side sections when the ring is expanded into engagement with the side sections of the base. Also, the central portion 17 of the ring and the adjacent faces 18 of the side sections may be slightly tapered, if desired, to insure a rigid and accurate engagement between the side sections of the ring substantially throughout their peripheral edges.

It is customary to expand slightly the base when it is pressed axially onto the fixed rim of a wheel so that the base frictionally engages the rim and becomes tensioned thereon. It will be noticed that when the base is mounted for use on a wheel, relative movement of the parts is prevented. Relative circumferential movement is prevented, due to the connection of the retaining member to the side sections. Relative lateral movement is prevented, due to the interlocking engagement of the ring and the retaining member with the side sections.

It is obvious that the ring 10 can be chosen of such length that any desired degree of stressed relation between the spacing ring 10 and the side sections 1 and 2 can be obtained by expanding the ring against said sections, as for example by tightening the retaining member 14 and thus tending to separate or force apart the ends of the ring and thus enlarge and press the ring tightly in position against the peripheral edges of the side sections.

It will also be seen that when the base is removed from the wheel the retaining member and the ring are easily removable and the various parts thereof can be used again for receiving a new tire.

This application is a division of my prior application, Serial No. 607,948, filed December 14, 1922, for cushion tire structure and method of making same.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of assembling a cushion tire structure which consists in inserting a transversely split spacing ring between a pair of side sections having an arched rubber tire body secured thereto, inserting an expanding member between the juxtaposed ends of the spacing member, and operating said expanding member to furthr forcibly enlarge the ring to stressed interlocking engagement with the side sections while securing said expanding member in position.

2. The method of assembling a cushion tire structure which consists in interposing a transversely split spacing ring between a pair of side sections having an arched rubber tire body secured thereto, inserting an expanding member between the juxtaposed end portions of the spacing ring, and operating said expanding member to further forcibly enlarge the ring to stressed interlocking engagement with the side sections.

3. The method of assembling a cushion tire structure which consists in inserting a spacing ring having substantially true circular seating faces between a pair of spaced side sections of a base band having an arched cushion tire body secured thereto, causing the ring to initially seat within the side sections substantially over its entire seating face, and forcibly expanding said ring after it is inserted in place between said side sections.

4. The method of assembling a cushion tire structure which consists in inserting a spacing ring between a pair of spaced side sections of a base band having an arched cushion tire body secured thereto, said ring having substantially true circular form in its initial seating position, and forcibly expanding said ring after it is inserted in place between said side sections, and interlocking said ring with each of said side sections to prevent relative circumferential movement of said side sections.

5. The method of assembling a cushion tire structure which consists in inserting an expansible split ring in seating position between a pair of spaced annular side sections of a base band having an arched cushion tire body secured thereto, permitting said ring to spring into position between the side sections and to assume substantially true circular form substantially throughout its length, and subsequently crowding said ring into intimate seating relation with the side sections by applying force solely to the ends of the ring.

6. The method of assembling a cushion tire structure which consists in inserting an expansible split ring between a pair of spaced annular side sections of a base band having an arched cushion tire body secured thereto, inserting a spacing member between the ends of said ring and forcing said spacing member radially outward to forcibly enlarge said spacing ring until all portions of said ring and said spacing member are within the bounding planes of the side sections.

7. The method of assembling a cushion tire structure which consists in vulcanizing a tire body to a pair of side sections of a base band, arranging a split ring having seating faces within and between said spaced members substantially in contact throughout its seating face with the side members, and then forcibly enlarging said ring while in seating engagement with said spaced members to substantially space the initial juxtaposed seating faces of the end portion of the ring.

8. The method of assembling a cushion tire structure which consists in inserting an expansible split ring between a pair of spaced annular side sections of a base band having an arched cushion tire body secured thereto, permitting said ring to spring into position between the side sections and with its end portions in opposed relation and to seat on said side sections substantially throughout its length, and subsequently applying pressure to the opposed end portions of the ring to crowd said ring into stressed seating relation with the side sections without increasing the circumferential length of the initial seating portion of the ring, the components of the applied force being transmitted to the ends of the ring in the direction of its length.

9. The method of assembling a cushion tire structure which consists in inserting an expansible split ring between a pair of spaced annular side sections of a base band having an arched cushion tire body secured thereto, inserting a wedge-shaped expanding member between the ends of said ring, and operating said expanding member radially outward to crowd said ring into rigid seating relation with the side members.

10. The method of assembling a cushion tire structure which consists in permanently vulcanizing a unitary chambered body of rubber composition on a pair of spaced annular base sections having annular ring seating shoulders, formed on their opposed inner edge portions, forming a spacing ring with oppositely disposed seating shoulders adapted to laterally interlock with the annular seating shoulders of the base sections, said ring having a localized expanding element adapted to enlarge the ring by being forced radially outward, inserting said spacing ring between said spaced annular base sections with the seating shoulders of the spacing ring interlocked with the seating shoulders of the base sections, and forcibly moving the expanding element of the ring radially outward to a position substantially in alignment with the remainder of the ring thereby forcibly enlarging said ring to an internal diameter at least as great as the inner diameter of the base sections without stretching the metal of the ring to provide a completely closed laterally interlocked rigid base for the tire of the internal diameter of the base sections.

11. The method of assembling a cushion tire structure which consists in permanently vulcanizing a unitary chambered body of rubber composition on a pair of spaced annular base sections having annular seating shoulders formed on their opposed inner edge portions for receiving a spacing ring, inserting between the spaced annular base sections a discontinuous spacing ring having a pair of opposed seating shoulders adapted to interlock with the corresponding seating shoulders of the base sections, said ring embodying a localized expanding element adapted to enlarge the ring by being forced radially outward, forcibly moving the expanding element of the ring radially outward to a position substantially in circumferential alignment with the remainder of the ring to thereby forcibly enlarge said ring to an internal diameter at least as great as the internal diameter of the base sections, and to force the seating shoulders of the spacing ring into stressed interlocking engagement with the seating shoulders of said base sections without stretching the metal of the ring to thereby provide a completely closed rigid base for the tire structure of the internal diameter of the base sections.

12. The method of assembling a cushion tire structure which consists in permanently vulcanizing a unitary chambered body of rubber composition on a pair of spaced annular base sections having annular ring seating shoulders formed on their opposed inner edge portions, forming a spacing ring with oppositely disposed seating shoulders adapted to laterally interlock with the annular seating shoulders of the base sections, said ring being cooperatively arranged with an expanding element adapted to enlarge the ring by being forced radially outward, inserting said spacing ring between said spaced annular base sections with the seating shoulders of the spacing ring interlocked with the seating shoulders of the base sections, and forcibly moving the expanding element radially outward to a position substantially in alignment with the remainder of the ring thereby forcibly enlarging said ring to an internal diameter at least as great as the inner diameter of the base sections without stretching the metal of the ring to provide a completely closed laterally interlocked rigid base for the tire of the internal diameter of the base sections.

13. The method of assembling a cushion tire structure which consists in permanently vulcanizing a unitary chambered body of rubber composition on a pair of spaced annular base sections having annular seating shoulders formed on their opposed inner edge portions for receiving a spacing ring, inserting between the spaced annular base sections a discontinuous spacing ring having a pair of opposed seating shoulders adapted to interlock with the corresponding seating shoulders of the base sections, said ring being cooperatively arranged with an expanding element adapted to enlarge the ring by being forced radially outward, forcibly moving the expanding element radially outward to a position substantially in circumferential alignment with the remainder of the ring to thereby forcibly enlarge said ring to an internal diameter at least as great as the internal diameter of the base sections and to force the seating shoulders of the spacing ring into stressed interlocking engagement with the seating shoulders of said base sections without stretching the metal of the ring to thereby provide a completely closed rigid base for the tire structure of the internal diameter of the base sections.

In testimony whereof I hereunto affix my signature.

FRED R. KLAUS.